Figure 1:
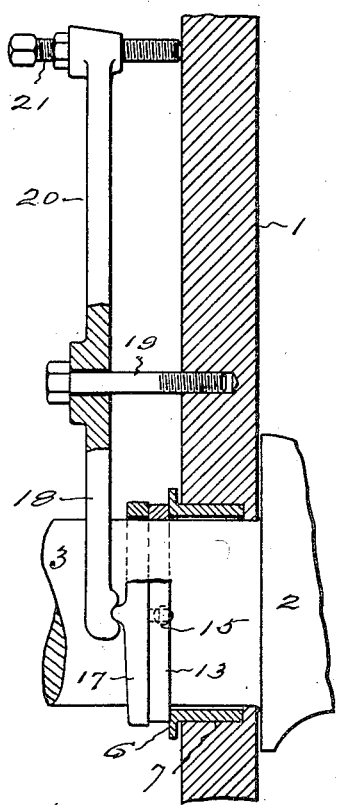

Sept. 8, 1925.

F. H. BANBURY

SHAFT PACKING

Filed Jan. 5, 1924

1,552,666

2 Sheets-Sheet 1

INVENTOR
Fernley H. Banbury
by Harry R. Williams
atty.

Sept. 8, 1925.                                                              1,552,666
                            F. H. BANBURY
                            SHAFT PACKING
                         Filed Jan. 5, 1924                    2 Sheets-Sheet 2
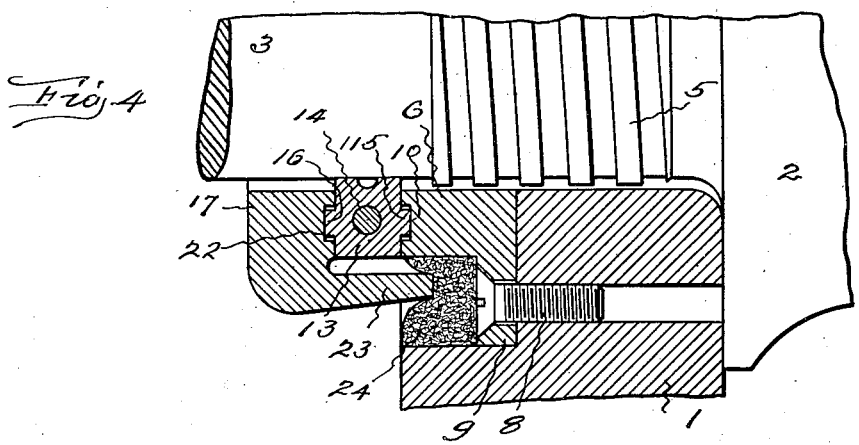
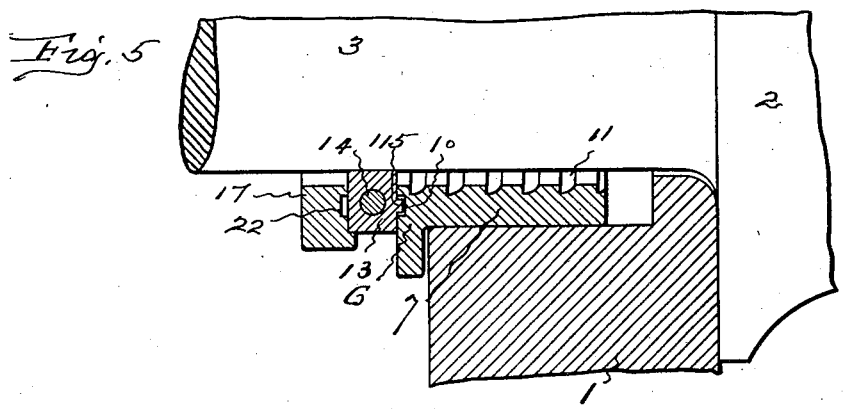
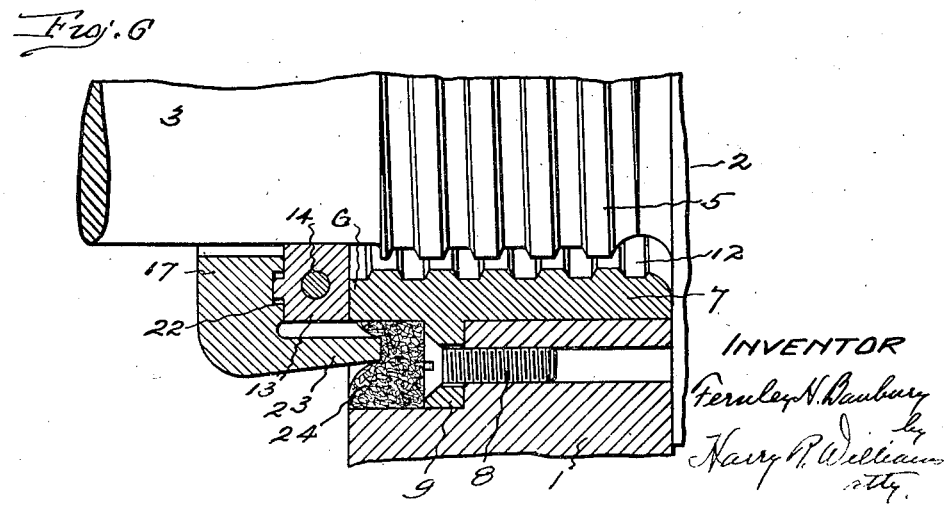
INVENTOR
Fernley H. Banbury
by Harry P. Williams
Atty.

Patented Sept. 8, 1925.

1,552,666

UNITED STATES PATENT OFFICE.

FERNLEY H. BANBURY, OF ANSONIA, CONNECTICUT, ASSIGNOR TO THE BIRMINGHAM IRON FOUNDRY, OF DERBY, CONNECTICUT, A CORPORATION OF CONNECTICUT.

SHAFT PACKING.

Application filed January 5, 1924. Serial No. 684,543.

*To all whom it may concern:*

Be it known that I, FERNLEY H. BANBURY, a citizen of the United States, residing at Ansonia, in the county of New Haven and State of Connecticut, have invented a new and useful Improvement in Shaft Packings, of which the following is a specification.

This invention relates to packings which are particularly adapted for keeping tight the openings in the casings through which pass the shafts of the rotors of machines for treating plastic materials, machines, for example, of the class shown in Patent #1,200,070 of Oct. 3, 1916. In machines of this type there are one or more chambers containing one or more masticating rotors designed when rotated to break up, crush and mix plastic stock that is fed to them. Owing to the severe strains to which the rotors are subjected on account of their shape and the resistance of the heavy, tough and abrasive material, there is considerable wear on the rotor shaft bearings and much trouble has been experienced in keeping the openings through the casing tight and preventing the sticky stock from exuding around the shafts under the heavy internal pressure generated. In the prior structures if the bearings wear, the packings in the stuffing boxes arranged about the shafts in the openings in the casing become compressed and the openings through them become enlarged permitting the leakage of stock from the masticating chambers. If the shafts could always be held concentric with the openings, the commonly used stuffing boxes could be made to answer, but even so they require constant attention to keep the joints tight.

The object of the present invention is to provide packings for the openings in the casings through which the rotor shafts of machines for treating plastic materials extend, that are not dependent for effectiveness upon perfect conditions and true concentricity of the shafts and the openings through which the shafts extend, and thereby ensuring tight joints for a long time with but little attention.

This object is attained by tightly fitting on the rotor shaft a packing ring of relatively soft metal between two bearing rings of very hard metal which do not closely fit the shaft, the inner hard metal ring being a part of or fixed to the casing and held against both longitudinal and rotary movements, and the outer hard metal ring being held against rotation but free to be moved longitudinally of the shaft and forced inward against the intermediate soft metal ring so as to keep the faces of the rings in such close contact that the material being treated cannot leak between the faces. The soft metal packing ring is fitted so closely to the shaft that it will rotate therewith and no leakage can occur between its inner surface and the exterior of the shaft, and yet may have under sufficient pressure a movement longitudinally of the shaft in order that the joints between the adjacent faces of the rings may be kept tight, and the shaft be free to float back and forth a slight amount during operation and under expansion and contraction resulting from the differences of temperature when working or idle. With this arrangement the joints are made between engaging surfaces that are transverse to the axis of the shaft, pressed together longitudinally of the shaft, so that the concentricity of the rotating and non-rotating parts and the enlargement of the bearings or reduction of the shaft becomes immaterial.

Figure 2:
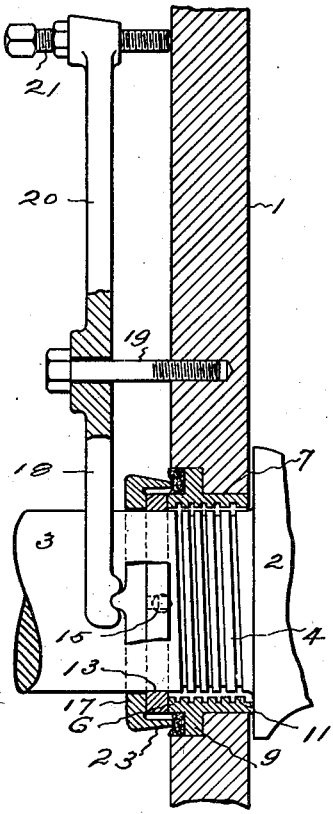
Figure 3:
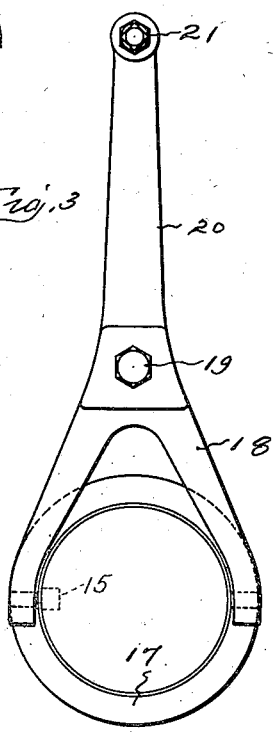

In the accompanying drawings Fig. 1 shows a side elevation with parts cut in section of so much of one embodiment as is necessary to an understanding of the invention. Fig. 2 is a similar view with details of the parts of a modified design. Fig. 3 shows a face view of the packing rings and means for keeping them in engagement. Fig. 4 illustrates on larger scale details of another form. Fig. 5 illustrates a modification. Fig. 6 illustrates still another modification.

In the views 1 indicates a section of the end wall of the casing of the chamber in which the plastic material is worked by the rotor 2, the shaft 3 of which passes freely through the end wall of the casing. If desired the shaft where it extends through the casing may be provided with spiral grooves 4 as shown in Fig. 2, or threads 5 as shown in Figs. 4 and 6, of such pitch and direction that when the rotor is worked any mass of plastic material that may escape past the end of the rotor will be fed back into the rotor chamber.

At the outer end of the opening in the casing through which the rotor shaft extends is a hard metal ring 6, desirably high grade steel. This ring may be the outer end of a bushing 7 which can extend partly through the wall of the casing, as shown in Figs. 1, 4 and 5, or way through the wall, as illustrated in Figs. 2 and 6. The ring is held from rotation and from outward movement by any suitable means, as by screws 8 passing through flanges 9 on the exterior of the bushing, as shown in Figs. 4 and 6. The outer end of the bushing which forms the bearing ring may be plane as illustrated in Figs. 1, 2 and 6, or it may be provided with a concentric groove 10, as shown in Figs. 4 and 5. The inner wall of the bushing can be smooth, as illustrated in Figs. 1 and 4, or may have spiral grooves 11, as shown in Figs. 2 and 5, or threads 12, as in Fig. 6. The opening in this ring and bushing is larger than the shaft.

Facing the inner hard metal ring is a soft metal ring 13, desirably of brass, which preferably is split and secured together by screws 14 to facilitate its application to the shaft. This ring is closely fitted to the shaft and fastened by a key 15 so that it rotates therewith, the key however not preventing the movement of the ring longitudinally of the shaft. The fit of this ring is sufficiently close to prevent any of the plastic material being treated in the machine from leaking between the internal surface of the ring and the external surface of the shaft, however, it is not so tight but what the ring may have a slight movement longitudinally of the shaft when sufficient pressure is applied, so as to keep it close against the face of the inner hard metal ring. The faces of the intermediate soft metal ring may be plane, as shown in Figs. 1 and 2, or may be provided with tongues 115 and 16, as illustrated in Fig. 4, or may have a tongue 115 on the inside, as shown in Fig. 5, or a tongue 16 on the outside as seen in Fig. 6. If the soft metal ring is provided with tongues, as suggested, the grooves in the adjacent hard metal rings should be sufficiently large to permit a slight transverse movement of the soft metal ring with the shaft, without causing any binding.

On the shaft outside of the soft metal ring is the outer hard metal ring 17, preferably of high grade steel. This ring has an internal diameter somewhat larger than the diameter of the shaft, and it is held closely against the face of the intermediate ring by a fork 18 which is loosely pivoted on the screw stud 19 that is turned into the end wall of the casing. In the end of the fork arm 20 is a screw 21 which is set against the outer wall of the casing so as to cause the fork to press the outer hardened steel ring against the intermediate soft metal ring and force the soft metal ring against the stationary inner hard metal ring. The inner face of the outer hard metal ring may be plane as shown in Fig. 1, or may have a groove 22, as illustrated in Figs. 4, 5 and 6. This outer ring may also have a petticoat 23 extending inward against a relatively soft packing 24 which may be located around the inner hard metal ring, to provide a double seal and at the same time allow for a slight decrease in thickness of the soft ring that will naturally occur from wear during use.

With this construction the inner and outer hard metal rings do not revolve while the intermediate soft metal ring revolves with the shaft, yet the intermediate ring so floats on the shaft that while there is no leakage between it and the shaft, the pressure against it of the outer hard metal ring will force it closely against the face of the inner hard metal ring. Any material that tends to leak must pass outward between the adjacent faces of the inner hard metal ring and the soft metal ring which extend in a plane transversely to the axis of the shaft and as these faces are pressed closely together all wear, which is longitudinal with the axis, can readily be taken up, and the liability of leakage is reduced to a minimum. Notwithstanding the fact that the soft metal ring may have a movement with the shaft at right angles to its axis, should the shaft bearing become worn, or the shaft be set out of center with the opening through the casing through which it extends, the joints will remain tight.

The invention claimed is:—

1. A packing for the rotor shaft opening through the casing of a machine for treating plastic materials, comprising in combination with the rotor shaft, three metal rings surrounding the shaft and arranged face to face, the inner of said rings having an opening larger in diameter than the shaft and fixed against rotary, transverse and longitudinal movements relative to the shaft, the outer of said rings having an opening larger in diameter than the shaft and fixed against rotary and transverse movements but capable of longitudinal movements relative to the shaft, and the intermediate of said rings closely fitted to and keyed to the shaft, said intermediate ring being capable of rotation with and movements transversely with the shaft between the inner and outer rings, and means for forcing the rings into close contact.

2. A packing for the rotor shaft opening through the casing of a machine for treating plastic materials, comprising in combination with the rotor shaft, an inner hard metal ring having an opening larger in diameter than the shaft, surrounding the shaft and fixed against rotary and longitudinal movements, a soft packing arranged about said inner ring, an outer hard metal ring having an opening larger in diameter than the shaft, surrounding the shaft and held against rotary and transverse movements but capable of movement longitudinally of the shaft, said outer ring having an inwardly extending petticoat projecting into engagement with said soft packing, a soft metal intermediate ring fitted closely to the shaft so as to rotate and move transversely therewith but capable of being moved longitudinally thereon between the hard metal rings, and adjustable means exterior of the outer ring for forcing the adjacent faces of the rings into close contact.

3. A packing for the rotor shaft opening through the casing of a machine for treating plastic materials, comprising in combination with the rotor shaft, an inner hard metal ring having an opening larger in diameter than the shaft, surrounding the shaft and fixed against rotary and longitudinal movements, a soft packing arranged about the inner ring, an outer ring surrounding the shaft and held against rotary and transverse movements but capable of movement longitudinally of the shaft, said outer ring having an inwardly extending petticoat projecting into engagement with said soft packing, a metal intermediate ring fitted closely to the shaft and keyed thereto so as to rotate and move transversely therewith but move longitudinally thereon, and adjustable means exterior of the outer ring for forcing the adjacent faces of the rings into close contact.

FERNLEY H. BANBURY.